W. G. COX.
AUTOMOBILE BUMPER BRACKET.
APPLICATION FILED OCT. 15, 1921.
1,429,410.
Patented Sept. 19, 1922.
2 SHEETS—SHEET 1.
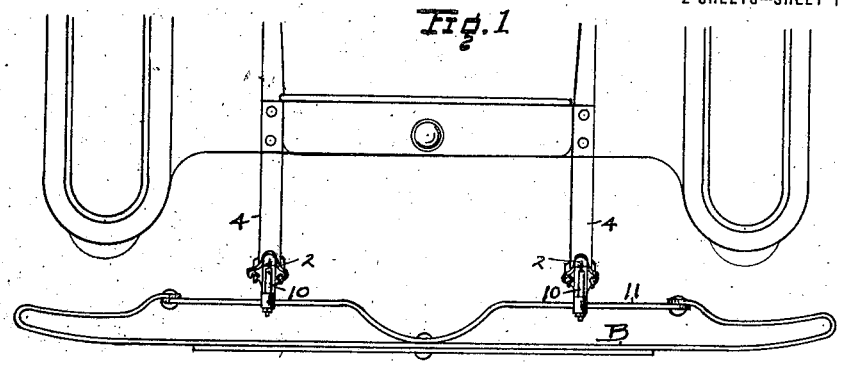
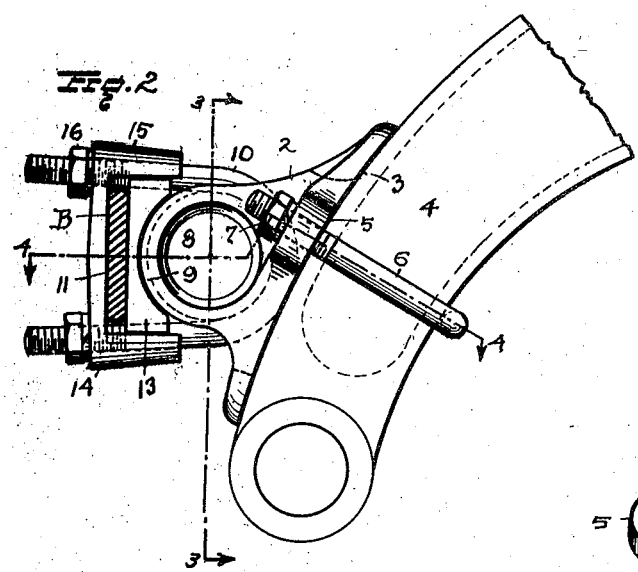
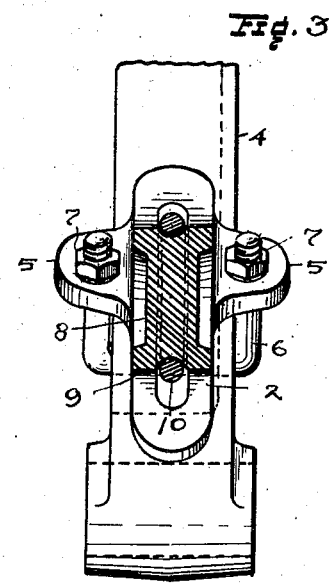
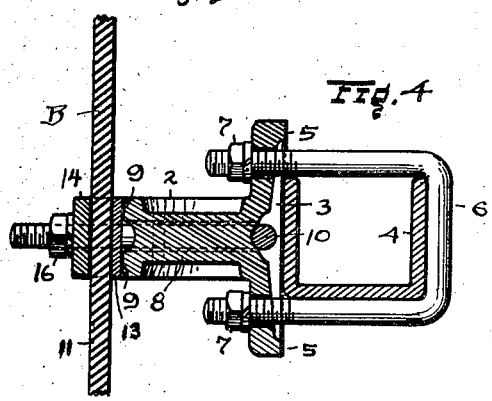
Inventor
W. G. Cox
By Fisher & Moset
Attorneys W. G. COX.
AUTOMOBILE BUMPER BRACKET.
APPLICATION FILED OCT. 15, 1921.
1,429,410.
Patented Sept. 19, 1922.
2 SHEETS—SHEET 2.
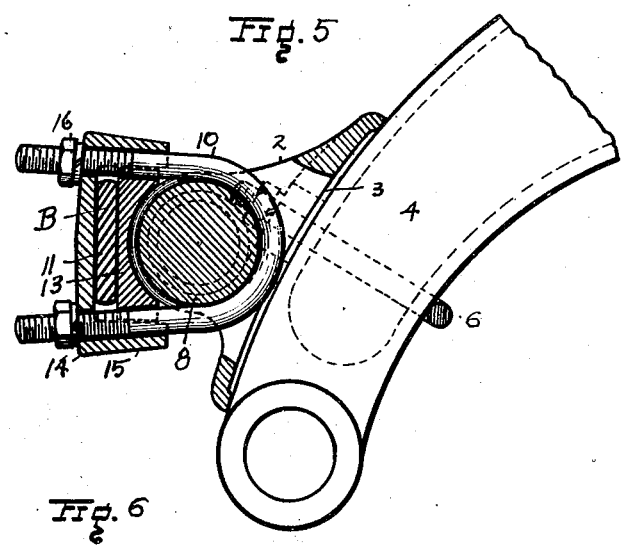
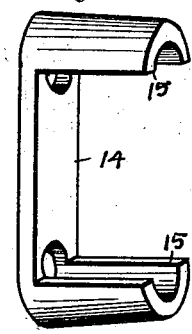
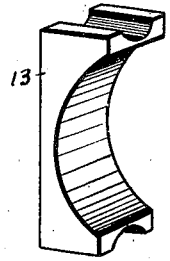
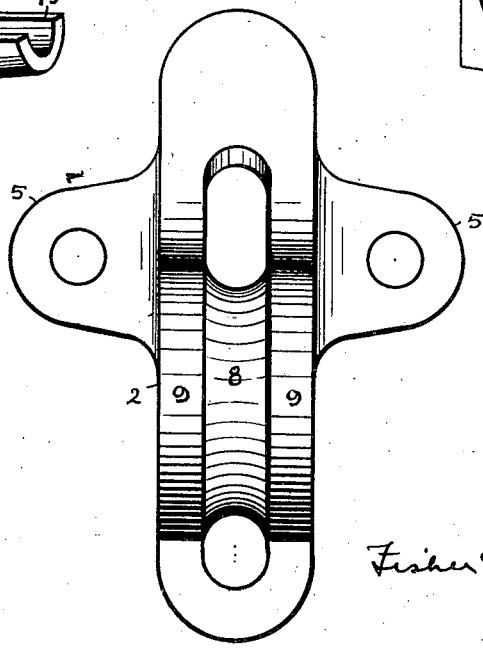
Inventor
W. G. Cox
Fisher & Moser
Attorneys Patented Sept. 19, 1922.

1,429,410

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

AUTOMOBILE BUMPER BRACKET.

Application filed October 15, 1921. Serial No. 507,838.

*To all whom it may concern:*

Be it known that I, WILLIAM G. COX, a citizen of the United States, residing at Cleveland, in the county of Cuyahoga and State of Ohio, have invented certain new and useful Improvements in an Automobile Bumper Bracket, of which the following is a specification.

My invention pertains to automobile bumpers, and more particularly to an improvement in a bracket for a spring bar bumper. Thus my invention involves a simple assembly of parts adapted to be seated upon the curved end portions of the chassis frame of an automobile and to be adjustably attached thereto to support the bumper at different elevations, and also particularly constructed to permit the bumper to be clamped rigidly at different angles in respect to the frame and with rotatable adjustable effect.

More specifically, the bracket consists of a saddle member and a pair of shackle members and co-operating clamping devices adapted to provide a universal coupling which will readily permit the attachment of these parts to an extending portion of an automobile, and also permit a rotatable adjustable clamping effect to be conveniently obtained for the bumper itself, all as herein shown and described and more particularly pointed out in the claims.

In the annexed drawings, Fig. 1 is a reduced plan view of a bumper affixed to the frame of an automobile by my improved brackets. Fig. 2 is an enlarged side view of the bracket showing a bumper bar therein. Fig. 3 is a cross-section transversely of the bracket on line 3—3 of Fig. 2. Fig. 4 is a horizontal section of the bracket and piece of the bumper on line 4—4 of Fig. 2. Fig. 5 is a vertical section centrally of the bracket. Figs. 6 and 7 are perspective views of the clamping plate and shoe, respectively, and Fig. 8 a front view of the saddle member of the bracket.

The chassis frames of automobiles in general vary considerably in form and construction, but usually the channeled sides curve downwardly at their ends and extend beyond the body, thus permitting the attachment of bumpers thereto at the front and rear of the frame. However, the length and the curvature of these exposed ends differ in many instances and must be considered in affixing the bumper at the proper height, angle and impact position upon the car. To facilitate adjustments and a rigid attachment of the bumper under the above conditions and to provide a neat and ornamental bracket adapted to be quickly and conveniently affixed upon each side member of the frame, I employ a saddle member 2 having a recessed base portion 3 which is curved to seat at its opposite end edges upon the upper curved face of the horn or extension 4 of the automobile frame. Saddle 2 is also provided with perforated ears 5 extending laterally at each side thereof to loosely receive the screw threaded ends of a yoke-shaped member or U bolt 6 lying in a horizontally-inclined plane in slip connection with the curved frame part 4. This coupling permits the saddle to be shifted to different heights on the frame and to be clamped rigidly in position when the nuts 7 are engaged with bolt 6 and tightened. Saddle 2 projects forwardly and embodies a horizontal shaft or round 8 intermediate two flat round friction faces 9, and the annular surface of round 8 is preferably in the form of a round groove to provide a friction seat for the round loop of U-bolt 10 by means of which a bumper B may be clamped at the front side of the saddle. The circular loop portion of U-bolt 10 passes through openings and the bottom recess in base portion 3 of the saddle and is free to turn within limits around the relatively large shaft 8 with the legs of the bolt extending forwardly in the same vertical plane a sufficient distance to receive the supporting arm or rear bar 11 of bumper B together with a friction shoe 13 interposed between said bar and the round friction faces or surfaces 9. A clamping plate 14, having perforations and channeled offsets 15 at its opposite ends is adapted to be sleeved over the legs of the U-bolt in straddling relation to bar 11 and shoe 13, and nuts 16 complete this clamping assembly for the bar. The inner side of shoe 13 is curved to fit the round friction faces 9 and the opposite side of the shoe is straight to bear flat against bar 11, while the upper and lower ends of shoe 13 are grooved or channeled to embrace the round legs of the U-bolt 10 and align the shoe vertically with the front side of the saddle.

In attaching the brackets to the curved frame ends 4 the first step is to fix the elevation and position of the saddles and to clamp them in place by means of the shackle bolts 6. Then the bumper may be clamped loosely upon the saddles by means of U-bolts 10 and their co-operating parts and adjusted transversely within the brackets to center it in front of the car frame and in respect to the wheels and fenders. The bumper may also be turned up or down at an angle or placed horizontally opposite the saddles upon the frame, and when the parts are properly placed the nuts are tightened to clamp the bracket and the bumper in immovable position.

What I claim, is

1. A bracket for automobile bumpers comprising a saddle, having round friction faces and a cross portion having a round annular groove intermediate said faces, a shackle member adapted to secure said saddle to the automobile frame, and a U-bolt seated between said faces within said groove having associated and clamping means adapted to secure a bumper adjustably upon said saddle.

2. A bracket for automobile bumpers, comprising a saddle having a round portion adapted to be frictionally engaged by a U-bolt, means adapted to clamp a bumper and said U-bolt jointly upon said saddle, and means adapted to secure said saddle upon an extension of the frame of an automobile.

3. A bracket for automobile bumpers, comprising a saddle having a forwardly projecting portion provided with a round portion, a U-bolt in loop connection with said round portion, a clamping plate and shoe and nuts associated with said U-bolt to clamp a bumper upon said saddle, and means adapted to shackle said saddle upon a portion of the frame of the automobile.

4. A bracket for automobile bumpers, comprising a saddle having an annular friction seat for the loop of a U-bolt and round friction surfaces adjacent thereto, a U-bolt encircling said seat having parallel screw-threaded legs, a friction shoe between said legs adapted to engage said round friction surfaces, and a clamping plate and nuts engaged with said legs adapted to clamp a bumper bar and the shoe rigidly in place upon the saddle.

5. A bracket for automobile bumpers, comprising a saddle having a curved base portion and a round projecting part embodying an annular groove, a U-bolt having a round loop seated within said groove, a separate clamping shoe and plate and nuts engaged with said U-bolt adapted to clamp a bumper upon said saddle, and a U-bolt and nuts adapted to clamp said saddle upon a curved extension of the automobile.

6. A bracket for automobile bumpers, comprising a saddle member having a recessed base portion and a round central projecting portion provided with an annular groove open to said recessed base portion and adapted to rotatably and frictionally seat the loop end of a yoke-shaped bumper clamping element therein.

7. A bracket for automobile bumpers, comprising a saddle having a circular portion, a yoke-shaped member encircling said circular portion, and clamping devices associated with said member adapted to secure a bumper and said member adjustably upon said saddle.

In testimony whereof I affix my signature.

WILLIAM G. COX.